United States Patent
Komashinskiy et al.

(10) Patent No.: US 11,245,666 B2
(45) Date of Patent: Feb. 8, 2022

(54) METHOD FOR DATA REDUCTION IN A COMPUTER NETWORK SECURITY SYSTEM

(71) Applicant: F-Secure Corporation, Helsinki (FI)

(72) Inventors: Dmitriy Komashinskiy, Espoo (FI); Paolo Palumbo, Espoo (FI)

(73) Assignee: F-Secure Corporation, Helsinki (FI)

( * ) Notice: Subject to any disclaimer, the term of this patent is extended or adjusted under 35 U.S.C. 154(b) by 336 days.

(21) Appl. No.: 16/452,752

(22) Filed: Jun. 26, 2019

(65) Prior Publication Data

US 2020/0036681 A1 Jan. 30, 2020

(30) Foreign Application Priority Data

Jul. 3, 2018 (GB) ..................... 1810894

(51) Int. Cl.
*H04L 29/06* (2006.01)
*G06N 5/02* (2006.01)
*G06N 5/04* (2006.01)
*G06N 20/00* (2019.01)

(52) U.S. Cl.
CPC ......... *H04L 63/0227* (2013.01); *G06N 5/025* (2013.01); *G06N 5/048* (2013.01); *G06N 20/00* (2019.01); *H04L 63/1416* (2013.01); *H04L 63/1425* (2013.01); *H04L 63/1441* (2013.01)

(58) Field of Classification Search
None
See application file for complete search history.

(56) References Cited

U.S. PATENT DOCUMENTS

| | | | |
|---|---|---|---|
| 2002/0019945 A1* | 2/2002 | Houston | H04L 43/10 726/23 |
| 2013/0091386 A1* | 4/2013 | Atkins | G06F 11/0784 714/37 |
| 2016/0098430 A1* | 4/2016 | Nakagawa | G06N 5/025 707/754 |
| 2018/0032908 A1* | 2/2018 | Nagaraju | G06F 11/30 |
| 2018/0089272 A1* | 3/2018 | Bath | G06F 16/951 |

\* cited by examiner

*Primary Examiner* — Joseph P Hirl
*Assistant Examiner* — Hassan Saadoun
(74) *Attorney, Agent, or Firm* — Harrington & Smith

(57) ABSTRACT

A method including collecting and aligning raw data from a plurality of network nodes, wherein dissimilar data types are aligned as input events; filtering the input events by discarding events and/or parts of events that are detected to be equal or similar to previously observed events or events and/or parts of events found to be redundant by using predetermined criteria; separating processing of the input events into event aggregation and event enrichment processes, wherein the event aggregation process includes processing all the input events for generating aggregated events, and the event enrichment process includes processing only events passed by the filtering and the aggregated events from the event aggregation process; and analysing the data received from the event enrichment process for generating a security related decision.

19 Claims, 6 Drawing Sheets

---

S201 Collecting and aligning raw data from plurality of network nodes, wherein dissimilar data types are aligned as input events

↓

S202 Filtering the input events by discarding events and/or parts of events that are equal or similar to previously observed events and/or redundant events

↓

S203 Processing all input events for generating aggregated events (aggregation process) → S204 Processing events passed by filtering and the received aggregated events (enrichment process)

↓

S205 Analysing data received from event enrichment process for generating security related decision

METHOD FOR DATA REDUCTION IN A COMPUTER NETWORK SECURITY SYSTEM

CROSS-REFERENCE TO A RELATED PATENT APPLICATION

This patent application claims priority from the Great Britain (GB) Patent Application No. 1810894.4 filed Jul. 3, 2018, hereby incorporated by reference in its entirety.

TECHNICAL FIELD

The present invention relates to a method for reducing data in a computer network security system and to a computer network security system.

BACKGROUND

Computer network security systems have started to become popular. An example of such is known as Endpoint Detection & Response (EDR) products and services. EDR focuses on the detection and monitoring of a breach as it occurs and after it occurs and helps to determine how best to respond. The growth of EDR has been made possible in part by the emergence of machine learning, big data and cloud computing.

EDR or other corresponding systems deploy data collectors on selected network endpoints (which can be any element of IT infrastructure). The data collectors observe activities happening at the endpoint and then send the collected data to a central, backend system ("EDR backend"), often located in the cloud. When the EDR backend receives the data, the data is processed (e.g. aggregated and enriched) before being analysed and scanned by the EDR provider for signs of security breaches and anomalies.

A problem with EDR however is that the volume of data produced by the data collectors is extremely large. Data volume is normally proportional to the activity occurring at a given EDR endpoint so when activity at that EDR endpoint is great, the produced data volume is also great.

The immediate consequences of such large volumes of data are the following:

Decreased Quality of Service

All of the data that the EDR backend receives needs to be processed and analysed. Whilst some of the data will be useful and possibly contain information indicative of a security breach, much of it is likely to be irrelevant for security purposes. In order to determine what data is or isn't useful, all of the data received by the EDR backend needs to be processed and analysed first. The practical consequence of this is that there is an inherent time delay between observation by the data collectors and reaction by the EDR provider and its security teams. It also means that the data used by the security teams to make decisions will not be current as it is subject to the processing and analysing time delay. If security teams do not have current data, it becomes much more difficult to react effectively to potential signs of a breach. It also makes it much easier for a skilled malicious actor to cover up his tracks as he will always be two steps ahead.

Increased Cost of Service

Despite the benefits of ever-improving cloud computing platforms, there is a resource cost (and therefore monetary cost) associated with managing large volumes of data. When high volumes of data need to be processed and made available in a useable format, the associated resource overheads and monetary costs can in some cases be very large for the EDR provider, which in turn can increase the cost of providing EDR to customer organisations. Many organisations thus simply opt not to implement EDR and continue to rely solely on EPPs (Endpoint Protection Platforms), which presents a security risk.

Some EDR systems have proposed reducing the data overhead by being selective about what data is collected (i.e. a policy of selective data collection limitation). However, this solution is problematic because effective monitoring, detection and forensic analysis often requires as complete a data picture as possible. It is often not possible to know in advance what data will be required to monitor and track a malicious actor. Realising that key pieces of information were not collected can often put a stop to any investigation, rendering such EDR systems ineffective.

There is a need to improve the way in which data is collected and processed in the context of EDR systems. There is also a need to decrease resource consumption and scalability issues that are caused by the continuously increasing data growth.

SUMMARY

According to a first aspect of the invention there is provided a method in a computer network security system as specified in claim 1.

According to a second aspect of the invention, there is provided a server as specified in claim 10.

According to a third aspect of the invention, there is provided a computer program product comprising a computer storage medium having computer code stored thereon, which when executed on a computer system, causes the system to operate as a server according to the above second aspect of the invention.

DETAILED DESCRIPTION

Figure 1:
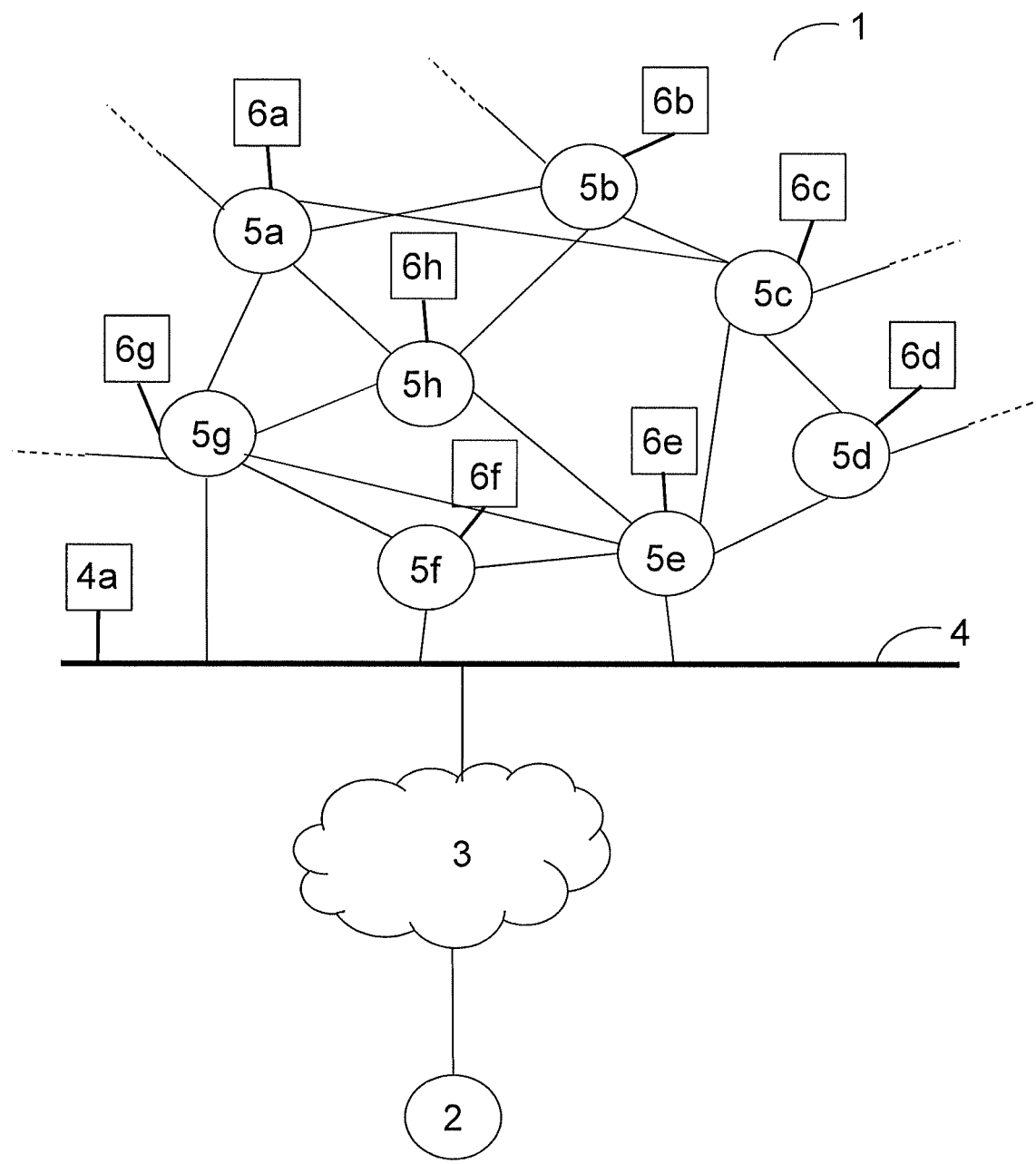
FIG. 1 illustrates schematically a network architecture.

FIG. 1 illustrates schematically a part of a first computer network 1 into which a computer system, for example an EDR system, has been installed. Also any other computer system that is able to implement the embodiments of the invention can be used instead or in addition to the EDR system used in this example. The first computer network is connected to an EDR backend 2 through the cloud 3. The EDR backend 2 forms a node on a second computer network relative to the first computer network. The second computer network is managed by an EDR system provider and may be separated from the cloud 3 by a gateway or other interface (not shown) or other network elements appropriate for an EDR backend 2. The first computer network 1 may also be separated from the cloud 3 by a gateway 4 or other interface. Other network structures are also envisaged.

The first computer network 1 is formed of a plurality of interconnected nodes 5a-5g, each representing an element in the computer network 1 such as a computer, smartphone, tablet, laptop, or other piece of network enabled hardware. Each node 5a-5g shown in the computer network also represents an EDR endpoint onto which a data collector (or "sensor") 6a-6g has been installed. Data collectors may also be installed on any other element of the computer network, such as on the gateway or other interface. A data collector 4a has been installed on the gateway 4 in FIG. 1. The data collectors, 6a-6h, 4a collect various types of data at the nodes 5a-5h or gateway 4 including, for example, program or file hashes, files stored at the nodes 5a-5h, logs of network traffic, process logs, binaries or files carved from memory (e.g. DLL, EXE, or memory forensics artefacts), and/or logs from monitoring actions executed by programs or scripts running on the nodes 5a-5h or gateway 4 (e.g. tcp dumps).

It is envisaged that any type of data which can assist in detecting and monitoring a security breach may be collected by the data collectors 6a-6h, 4a during their lifecycle and that the types of data which are observed and collected may be set according to rules defined by the EDR system provider upon installation of the EDR system or in response to instructions from the EDR backend 2. For example, the data collectors 6a-6h, 4a may collect data about the behaviour of programs running on an EDR endpoint and can observe when new programs are started. Where suitable resources are available, the collected data may be stored permanently or temporarily by the data collectors 6a-6h, 4a at their respective nodes or at a suitable storage location on the first computer network 1 (not shown).

The data collectors 6a-6h, 4a may also perform some simple, preliminary processing steps on the collected data but this is limited by the computing and network resources available at each node 5a-5h or gateway 4. One of the advantages of the data collectors 6a-6h, 4a is that they are configured to have a small footprint so that they do not disrupt normal functioning of the first computer network 1 through over use of bandwidth or computing power. As such, if the data collectors 6a-6h, 4a perform simple, preliminary processing steps on the collected data themselves, it should not disrupt normal functioning of the first computer network 1.

The data collectors 6a-6h, 4a are set up such that they may send information such as the data they have collected or send and receive instructions to/from the EDR backend 2 through the cloud 3. This allows the EDR system provider to remotely manage the EDR system without having to maintain a constant human presence at the organisation which administers the first computer network 1.

Figure 2:
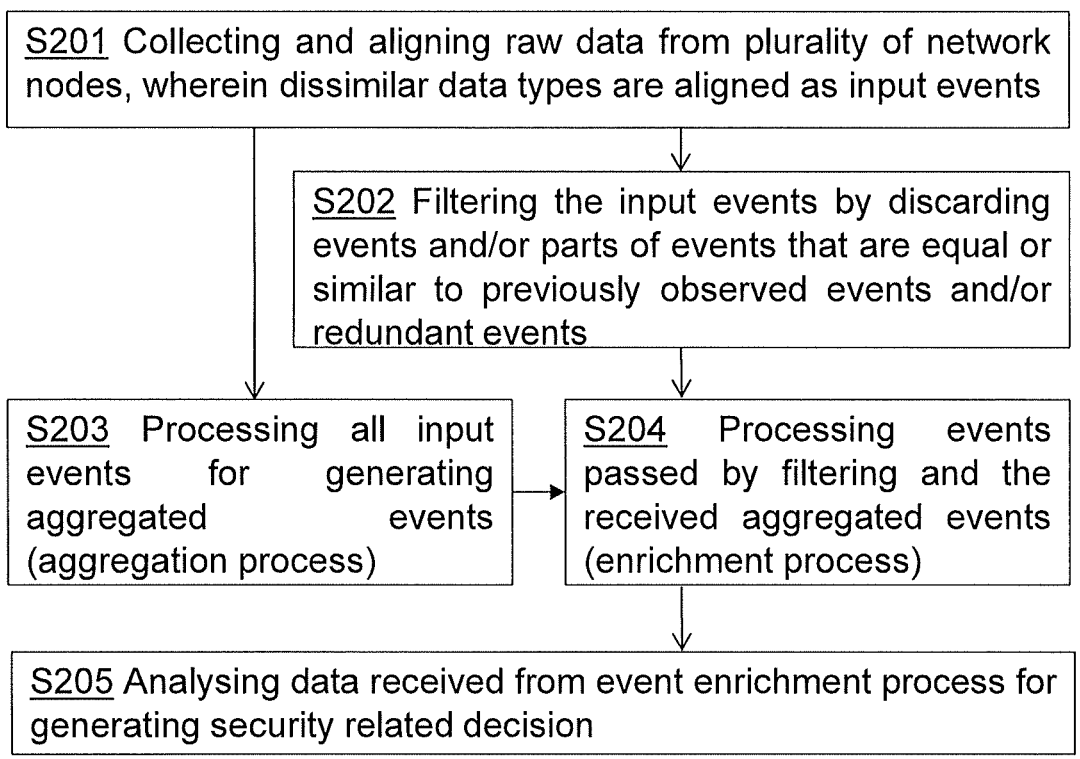
FIG. 2 is a flow diagram illustrating a method according to an embodiment.

FIG. 2 is a flow diagram illustrating a method according to an embodiment.

In S201, raw data is collected and aligned from plurality of network nodes (5a-5h), wherein dissimilar data types are aligned as input events. The raw submission processing components are responsible for an initial preprocessing of all data submission that are received from various kinds of endpoint sensors. The purpose of this is to make all dissimilar data types aligned such that the next level components of the data processing pipeline are able to interpret/deal with the data blocks (further referred to as events).

In S202, the input events are filtered by discarding events and/or parts of events that are equal or similar to previously observed events. Also events and/or parts of events that are found to be otherwise unnecessary/redundant may be discarded. Predetermined criteria may be used to filter the events and/or to determine the similarity of the events to previously observed events and/or to determine whether the events are redundant or not. In an embodiment, an events lookup component may be used for the filtering of events. In an embodiment, the event lookup process may rely on a modifiable lookup logic that defines at least some of the following procedures: how to form a lookup cache that collects information about already observed events; how to perform lookup queries or similarity searches to the lookup cache in order to check which of the new input events have been observed already (for example, the event lookup component may pass through only new, previously unseen events according to the lookup logic); what elements of the passed through events should be kept in the events as essential for the event analysis; what elements of the passed through events should be dropped from the events as useless for the event analysis.

In an embodiment, the filtering process further comprises determining each input event a level of uniqueness on the basis of predetermined event elements, and using the determined level of uniqueness to decide whether an input event has been observed before.

In S203, all input events are processed in an event aggregation process for generating aggregated events and in S204 only events passed from the filtering process (S202) and the aggregated events from S203 are processed in an event enrichment process. The events prepared during the previous data processing require sometimes very selective processing that aims on expanding the input events into a form of fact that are interpretable and valuable for decision making components. In the embodiments of the present invention, events enrichment and aggregation are separated processes.

All events from the raw submissions processing are taken into account in S203 event aggregation process, however, this process does not require events from the enrichment process 8204. Only events from the events lookup component and the facts received from the events aggregation process are required in the events enrichment process S204. In the aggregation process, various pieces of content from input events are used for forming new events, here aggregated events. Information about the input events to support the creation of different views according to specific types of entities related to the input events are aggregated. Usually the process of new events' preparation is carried out for describing general (activity) states for particular entity types (organizations, hosts, network segments, processes etc.) that are described by input events. The aggregated events (facts) are then passed to the enrichment phase. In the enrichment process, the structure and context of input events is extended with already collected knowledge. The extended events (facts) are then passed to event analysis process.

In S205, data received from event enrichment process is analysed for generating security related decision. An event analysis component used for the analysis may use any rules, heuristics, machine learning models etc. to analyse the facts received from the events enrichment process in order to find appropriate decisions and recommendations (detections) that positively impact state of the protected IT infrastructures in real time. In an embodiment, the event analysis component may provide a control channel for controlling the events lookup component. The control channel enables a possibility to define the modifiable lookup logic according to the requirements of the decision making process.

Figure 3:
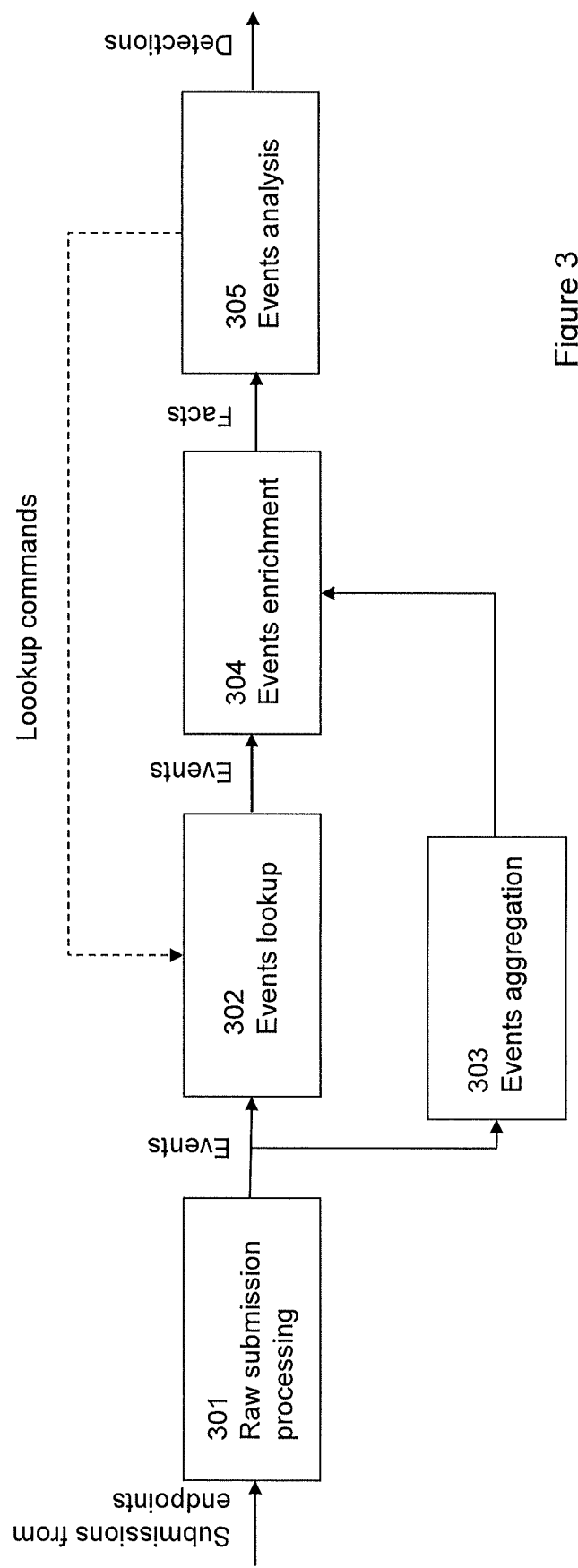
FIG. 3 is an example of a data processing flow according to an embodiment.

FIG. 3 is an example of a data processing flow according to an embodiment. The method steps described in relation to FIG. 2 are processed by the components illustrated in FIG. 3. The raw data from plurality of network nodes is processed (S201) at component 301. Events lookup component 302 is responsible for the input events filtering (S202). Events aggregation component 303 is responsible for aggregating the input events (S203). Events enrichment component 304 takes care of events enrichment (S204) for the events received from the events lookup component 302 and the facts received from the events aggregation component 303. Events analysis component 305 analyses (S205) the facts received from the events enrichment component 304 for generating security related decisions. The events analysis component 305 may also be configured to dynamically control a lookup logic on the basis of it's analysis and send lookup commands to the events lookup component 302. The filtering of the input events is based on the lookup logic defining processes for at least one of: generation of a lookup cache collecting information about already observed events, performing lookup queries to the lookup cache for checking which events have been observed already, determining essential elements of the passed through events required for the analysis, determining unnecessary elements of the passed through events to be culled.

If, based on the results from the events analysis component, a sign of a breach is detected, further actions may be taken such as taking immediate action by changing the settings of the network nodes in order to ensure an attacker is stopped and any traces of their moves is not destroyed. Changing the settings may include, for example, one or more nodes (which may be computers or other devices) being prevented from being switched off in order to preserve information in RAM, a firewall may be switched on at one or more nodes to cut off the attacker immediately, users of the one or more nodes may be warned that a breach has been detected and that their workstation is under investigation, and/or a system update or software patch may be sent from the EDR backend 2 to the nodes in response to detecting a sign of a breach. It is envisaged that one or more of these actions may be initiated automatically by the above-described algorithms. For example, using the above described methods, data has been collected and sent from the nodes in the computer network 1 to the EDR backend 2. The analysis algorithm has determined that a sign of a breach was detected. As soon as the algorithm makes the determination that a sign of a breach was detected, it may generate and issue a command to the related network nodes without human intervention to automatically initiate one or more of the above-described actions at the nodes. By doing this, a breach can be stopped and/or the damage minimised automatically at very high speeds and without human intervention.

It is envisaged that the action of automatically updating system software or sending software patches in response to detecting a sign of a breach will be particularly effective for corporate computer networks whose administrators apply updates and patches only in bulk at infrequent intervals. The method allows such administrators to continue their existing policies without disruption but gives the EDR system an autonomous, automatic override to apply updates and patches in emergency situations without human intervention. For example if a breach occurs at night and the administrator cannot be contacted, the EDR system automatically performs the necessary actions. By the time the administrator is contacted again, the computers on the network have been safely updated and the spread of the attack minimised. Attacks using zero-day exploits in particular can be stopped in their tracks by such a method.

The above-described methods contrasts with existing security products (both EPPs and EDR systems) where most of the data collection, processing, and analysing procedures are manual such that it would not be possible to implement automatic response actions at equally high speeds and accuracy. This technical advantage is particularly realised over traditional systems which are based on human instinct and experience of security teams, intelligent guessing, and traditional statistics. Whilst such traditional systems are implemented using computers (given the nature of the technical field of the invention), they still ultimately rely on human decision making. As such, the present invention is more than merely automation of traditional techniques and it does not pre-empt the traditional, manual systems described above.

The code required to implement data collectors ("sensors") may be based on Google™ GRR ("rapid response"), Facebook™ osquery, or can be built from scratch. It is envisaged that whatever code is used, it should at least be capable of performing the commands of: get file hashes on demand, download files from specified directories, dump network traffic, connections and processes. It must also be able to collect different types of data not normally associated with security systems but which can still be useful in EDR systems.

Generally, the proposed approach introduces number of improvements to conventional EDR backend data processing pipeline schemes. Such improvements comprise, for example, adding the event lookup component that filters out events and/or wipes out unnecessary parts of events that do not need to be passed to the next elements of the pipeline. The default decision logic of the event lookup is to block and/or clean up events that have already been observed or that are similar when compared to the already observed events.

Another improved according to an embodiment is the separated data processing flows for event enrichment and event aggregation logic that divide default responsibilities in the following manner: an event enrichment procedure is performed only for events that are successfully passed through the event lookup component and an event aggregation procedure is performed for all events. Thanks to the event lookup filtering/cleaning, the events enrichment component is required to process significantly reduced amount of data and pass the processed data to the following event analysis component. The event aggregation procedure aggregates information relating to the events in a form of "states" for different types of entities (e.g. organizations, hosts, network segments, processes etc.) and reports the accumulated states in a regular, scheduled manner. Thus, the aggregation process positively impacts the data in terms of its decreased size and at the same time represents all events in a reasonably compressed form. This procedure substantially mitigates risks to loose any important information relating to the repeated events that may be blocked by the event lookup component.

In an embodiment, a control channel from the event analysis component to the event lookup component is used. This mitigates risks to delay the process of delivering potentially valuable information about the repeated events. In order to mitigate this risk, the control channel may be established to enable the analysis components (e.g. rules, machine learning models etc.) tuning the lookup logic (e.g. resetting the lookup cache, defining the repeated events that have to be passed through/blocked by the event lookup procedure unconditionally, defining the event fields that the analysis components require or do not require at all).

Generally, as described above, the invention aims to overcome one of the critical problems of reducing the amount of data processed. The embodiments of the invention provide a flexible, adaptive data selection approach that is driven fully by an analysis engine that is able to take advantage of machine learning, statistics, heuristics and any other decisional mechanisms. The embodiments of the invention also enable a flexible definition of events together with the associated definition of lookup. With the goal of supporting the abovementioned decision mechanisms, both horizontal and vertical data selection is enabled. The embodiments of the invention provide an integrated data processing pipeline with capabilities for both enhanced detection and data reduction.

Figure 4:
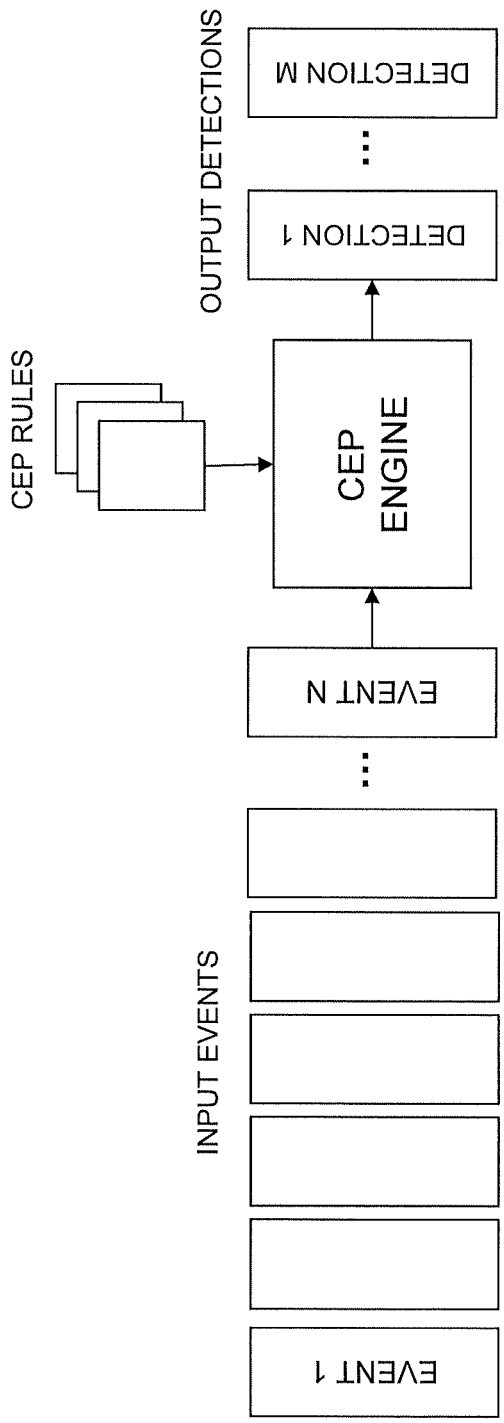
FIG. 4 is an example of a data processing pipeline.

Let's consider an example case illustrated by the data processing pipeline in FIG. 4. FIG. 4 shows a part of an EDR data processing pipeline where the key part is a CEP (Complex Event Processing) engine that is utilized for processing input events one by one so that if an event matches to a pattern defined by CEP rules, then the engine forms and outputs a new event. In this example, such output events are denoted as detections in this example. Usually the number N of input events is substantially higher than the number M of expected detections based on these input events: N>>M. This may mean (and usually does in the traditional event-based rule-oriented decision logic) that a substantial part of the input events is useless for decision making process and may be not passed to the CEP engine at all.

Figure 5:
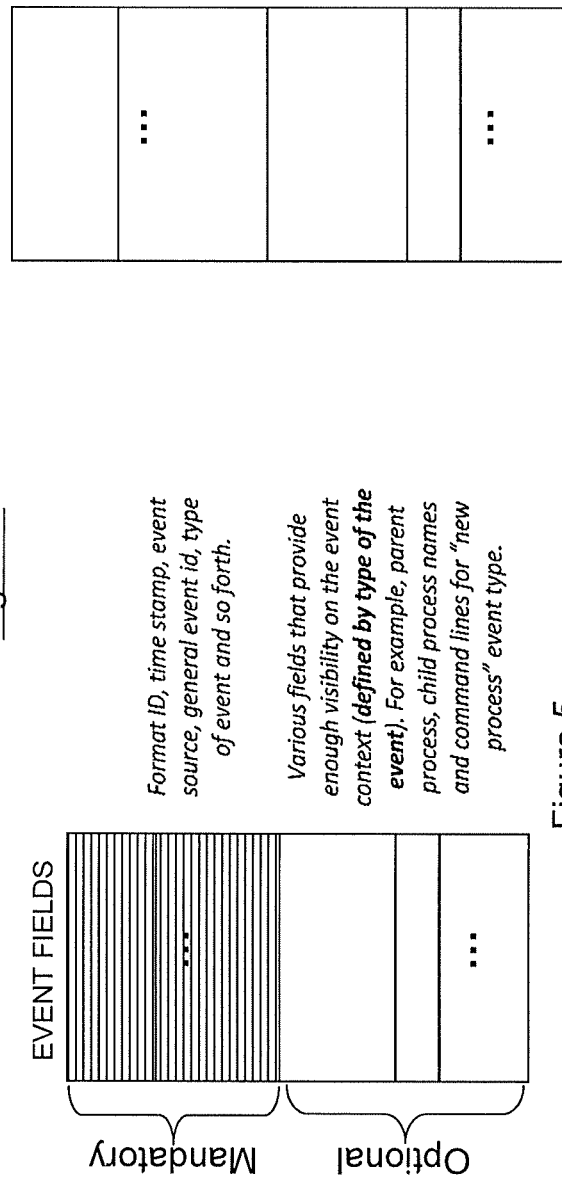
FIG. 5 is an example of an event structure.

Apparently this preliminary filter for the events going to the CEP engine has to be established on the basis of specific conditions that can be applied to each event. An example of a detailed event structure is illustrated in FIG. 5. Event fields may be comprised of both mandatory and optional fields as shown in FIG. 5. The format ID, time stamp, event source, general event id, type of event may be examples of mandatory event fields. Also various fields that provide enough visibility on the event context (defined by type of the event) may also be used, for example, parent process, child process names and command lines for "new process" event type.

Let's consider an ideal case when the CEP engine utilizes a single rule that is represented below:

```
IF event.type == "new_process" THEN
{
    // perform additional checks of the event type - specific fields
}
```

Figure 6:
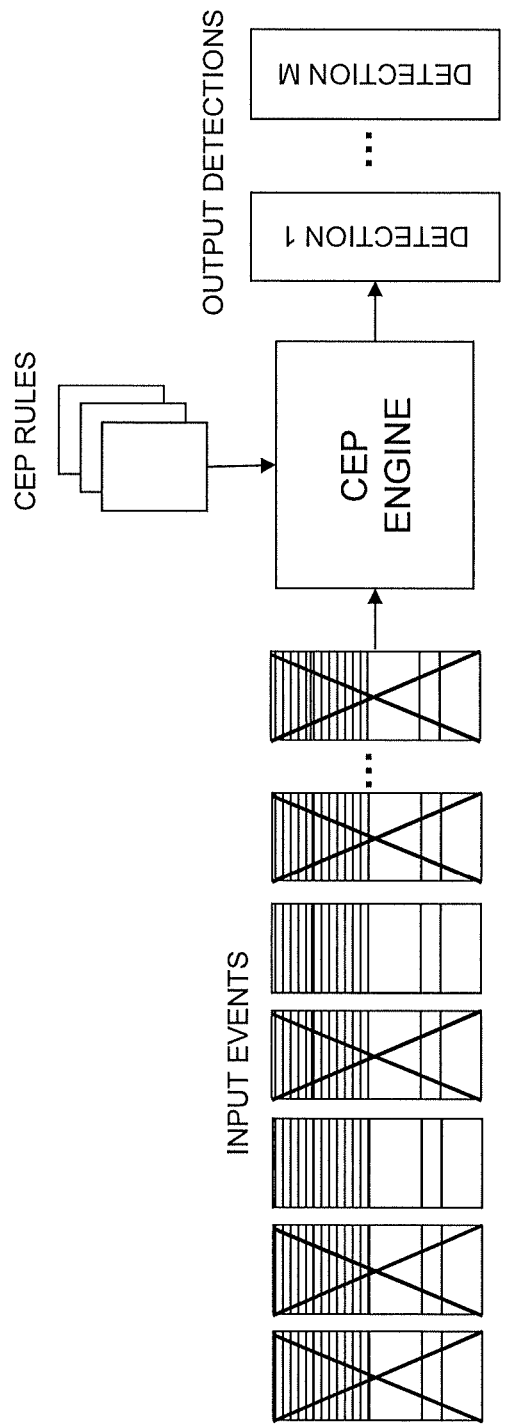
FIG. 6 is an example of a vertical data reduction approach.

In this example case it is clear that all events that have event type field non-equal to the "new_process" string can be dropped from the CEP engine's consideration without making any harm for the decision making process quality. In this example embodiment we denote such an approach as "vertical data reduction" (see FIG. 6). The vertical data reduction approach (VDR) is implementable with different combinations of conditions (all possible other combinations of rules, fuzzy logic etc.) adopted against mandatory event fields (e.g. source and/or time based).

Figure 7:
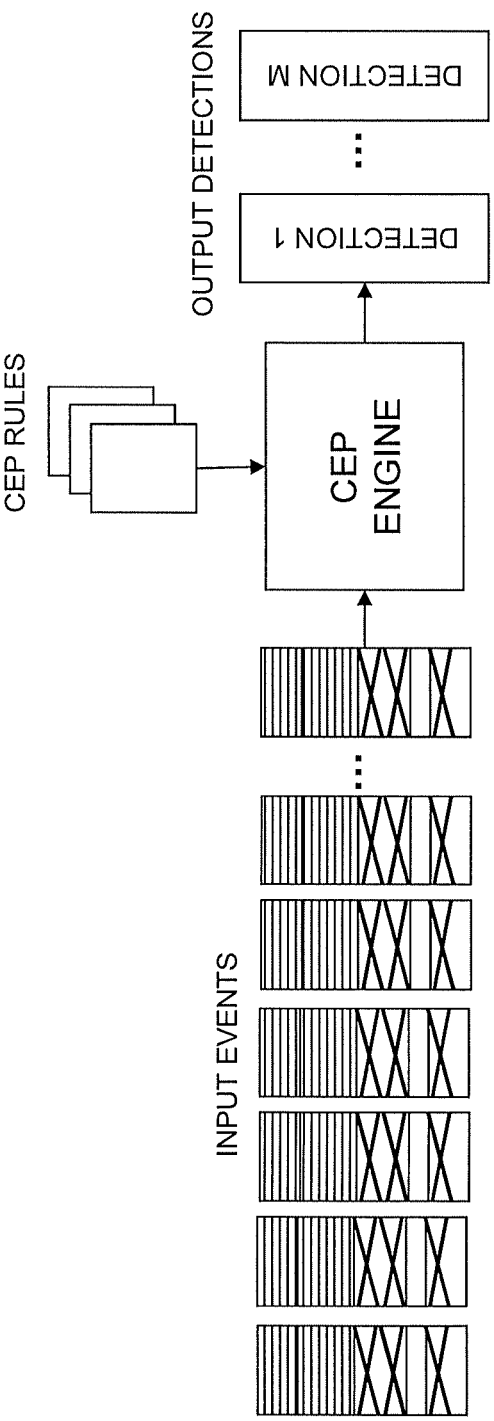
FIG. 7 is an example of a horizontal data reduction approach.

Although the VDR approach is clear and simple in the abovementioned example, in reality it will not bring benefits if the CEP engine has many rules relying on different event types. In order to deal with such a limitation it is necessary to introduce also a concept of a horizontal data reduction (HDR, see FIG. 7). Let's consider an advanced ideal case when the CEP engine utilizes a complete naive single rule that is represented below:

```
IF event.type == "new_process" THEN
}
    IF event.parent_process == "outlook.exe" AND
    event.child_process == "powershell.exe"
THEN
    // Make a detection pointing at a very suspicious behavioural
    pattern -
    // - outlook usually does not launch powershell unless it is an
    APT indicator
}
```

In such a situation it is clear that an additional shrinkage of each event structure will not harm as well. The compressed events will keep only mandatory attributes and a fraction of optional attributes that are required for making appropriate decision. We denote this approach as HDR; it is implementable with different combinations of conditions (all possible other combinations of rules, fuzzy logic etc.) applied against mandatory and optional event fields. In general it may be implemented as a separate data reduction approach or in a combination with VDR.

Figure 8:
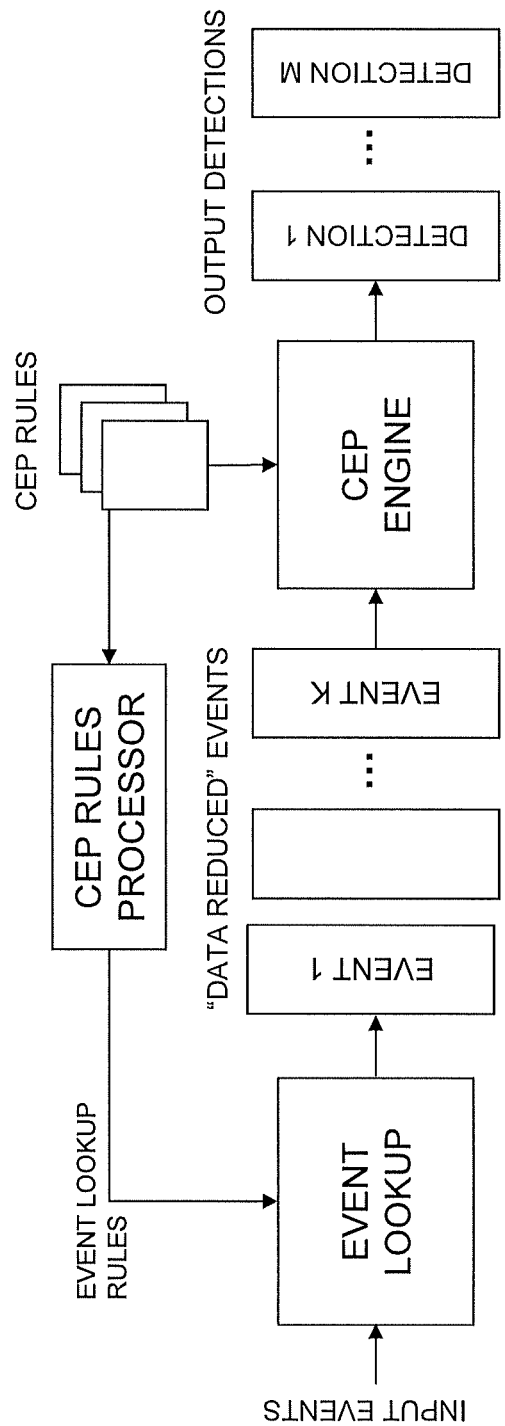
FIG. 8 is an example of an extended data processing pipeline according to an embodiment.

Now all necessary induction definitions and the statement of the problem are defined. The initial state (represented at the FIG. 4) can be now extended in a number of different ways by using a few additional components implementing necessary functionalities that are required for enabling VDR/HDR (see FIG. 8).

The input events are passed to the event lookup component that implements necessary HDR/VRD functionality. The event lookup component produces so called "data reduced" set of events that are critical for the decision making process that is being performed by the CEP engine. The CEP engine's rules have to be utilized (or, for example, appropriately extended with necessary lookup selection logic) in order to obtain from them the "event lookup rules" that define the selection logic for the event lookup component.

As described above, the nature of the model used by the EDR system may be, or may incorporate elements, from one or more of the following: a neural network trained using a training data set, exact or heuristic rules (e.g. hardcoded logic), fuzzy logic based modelling, and statistical inference based modelling. The model may be defined to take into account particular patterns, files, processes, connections, and dependencies between processes.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:
1. A method in a computer network security system, the method comprising:
  collecting and aligning raw data from a plurality of network nodes, wherein dissimilar data types are aligned as input events;

filtering the input events by discarding events and/or parts of events that are detected to be equal or similar to previously observed events or events and/or parts of events found to be redundant by using predetermined criteria;

separating processing of the input events into event aggregation and event enrichment processes, wherein the event aggregation process comprises processing all the input events for generating aggregated events, and the event enrichment process comprises processing only events passed by the filtering and the aggregated events from the event aggregation process; and analysing the data received from the event enrichment process for generating a security related decision.

2. The method according to claim 1, wherein filtering of the input events is based on a lookup logic defining processes for at least one of: generation of a lookup cache collecting information about already observed events, performing lookup queries to the lookup cache for checking which events have been observed already, determining essential elements of the passed through events required for the analysis, determining unnecessary elements of the passed through events to be culled.

3. The method according to claim 2, the method further comprising dynamically controlling the lookup logic on the basis of the analysis.

4. The method according to claim 1, wherein the filtering process further comprises determining for each input event a level of uniqueness on the basis of predetermined event elements, and using the determined level of uniqueness to decide whether an input event has been observed before.

5. The method according to claim 1, wherein said event aggregation process comprises aggregating information about the input events to support the creation of different views according to specific types of entities related to the input events.

6. The method according to claim 1, wherein said event aggregation process comprises creating aggregated events on the basis of predetermined event elements of the input events.

7. The method according to claim 1, wherein said event enrichment process comprises extending the structure and context of events with previously collected data.

8. The method according to claim 1, wherein said analysing the data comprises using at least one of the following processes for generating the decision:
predetermined rules, heuristics, machine learning models, fuzzy logic based models, statistical inference based model.

9. The method according to claim 1, in case the generated security related decision establishes that a security breach has been detected, taking further action to secure the computer network and/or any related network node, wherein the further action comprises one or more of the list of:
preventing one or more of the network nodes from being switched off;
switching on a firewall at one or more of the network nodes;
warning a user of one or more of the network nodes that signs of a security breach have been detected; and/or sending a software update to one or more of the network nodes.

10. A server comprising:
one or more processors, and
at least one non-transitory memory including computer program code, where the at least one non-transitory memory including the computer program code are configured with the one or more processors to cause the server configure to:

collect and align raw data from a plurality of network nodes, wherein dissimilar data types are aligned as input events;

filter the input events by discarding events and/or parts of events that are detected to be equal or similar to previously observed events or events and/or parts of events found to be redundant by using predetermined criteria;

separate processing of the input events into event aggregation and event enrichment processes, wherein the event aggregation process comprises processing all the input events for generating aggregated events, and the event enrichment process comprises processing only events passed by the filtering and the aggregated events from the event aggregation process; and analyse the data received from the event enrichment process for generating a security related decision.

11. The server according to claim 10, wherein filtering of the input events is based on a lookup logic defining processes for at least one of: generation of a lookup cache collecting information about already observed events, performing lookup queries to the lookup cache for checking which events have been observed already, determining essential elements of the passed through events required for the analysis, determining unnecessary elements of the passed through events to be culled.

12. The server according to claim 11, where the at least one non-transitory memory including the computer program code are further configured with the one or more processors to cause the server to dynamically control the lookup logic on the basis of the analysis.

13. The server according to claim 11, where the at least one non-transitory memory including the computer program code are further configured with the one or more processors to cause the server to:
determine for each input event a level of uniqueness on the basis of predetermined event elements, and using the determined level of uniqueness to decide whether an input event has been observed before in relation to the filtering.

14. The server according to claim 11, wherein said event aggregation process comprises aggregating information about the input events to support the creation of different views according to specific types of entities related to the input events.

15. The server according to claim 11, wherein said event aggregation process comprises creating aggregated events on the basis of predetermined event elements of the input events.

16. The server according to claim 11, wherein said event enrichment process comprises extending the structure and context of events with previously collected data.

17. The server according to claim 11, wherein said analysing the data comprises using at least one of the following processes for generating the decision:
predetermined rules, heuristics, machine learning models, fuzzy logic based models, statistical inference based model.

18. The server according to claim 11, in case the generated security related decision establishes that a security breach has been detected, taking further action to secure the computer network and/or any related network node, wherein the further action comprises one or more of the list of:

preventing one or more of the network nodes from being switched off;

switching on a firewall at one or more of the network nodes;

warning a user of one or more of the network nodes that signs of a security breach have been detected; and/or sending a software update to one or more of the network nodes.

19. A non-transitory computer storage medium having stored thereon computer program code for-implementing:

collecting and aligning raw data from a plurality of network nodes, wherein dissimilar data types are aligned as input events;

filtering the input events by discarding events and/or parts of events that are detected to be equal or similar to previously observed events or events and/or parts of events found to be redundant by using predetermined criteria;

separating processing of the input events into event aggregation and event enrichment processes, wherein the event aggregation process comprises processing all the input events for generating aggregated events, and the event enrichment process comprises processing only events passed by the filtering and the aggregated events from the event aggregation process; and analysing the data received from the event enrichment process for generating a security related decision.

\* \* \* \* \*